(12) United States Patent
Nakayama et al.

(10) Patent No.: US 7,582,696 B2
(45) Date of Patent: Sep. 1, 2009

(54) POLYPROPYLENE-BASED RESIN COMPOSITION AND MOLDED ARTICLE THEREOF

(75) Inventors: Kouichi Nakayama, Yokkaichi (JP); Yukihito Zanka, Yokkaichi (JP)

(73) Assignee: Japan Polypropylene Corporation, Tokyo (JP)

( * ) Notice: Subject to any disclaimer, the term of this patent is extended or adjusted under 35 U.S.C. 154(b) by 447 days.

(21) Appl. No.: 11/017,085

(22) Filed: Dec. 21, 2004

(65) Prior Publication Data

US 2005/0143510 A1  Jun. 30, 2005

(30) Foreign Application Priority Data

Dec. 26, 2003 (JP) ............................. 2003-436850
Feb. 23, 2004 (JP) ............................. 2004-046554

(51) Int. Cl.
*C08K 3/04* (2006.01)
*C08K 3/34* (2006.01)
*C08L 23/16* (2006.01)
*C08L 23/12* (2006.01)

(52) U.S. Cl. .................. 524/496; 524/495; 524/451; 524/425; 524/449; 524/445; 524/584; 524/579; 524/575; 525/240; 525/241

(58) Field of Classification Search ............... 524/582, 524/584, 583, 496, 451, 847, 495, 579, 575; 525/240, 241, 232

See application file for complete search history.

(56) References Cited

U.S. PATENT DOCUMENTS

| | | | | |
|---|---|---|---|---|
| 5,679,456 A | * | 10/1997 | Sakai et al. | 428/340 |
| 5,889,099 A | * | 3/1999 | Nagai et al. | 524/451 |
| 5,965,654 A | * | 10/1999 | Hirata et al. | 524/451 |
| 6,180,709 B1 | * | 1/2001 | Nishio et al. | 524/451 |
| 6,730,728 B2 | * | 5/2004 | Matsuda et al. | 524/451 |
| 6,747,086 B2 | * | 6/2004 | Guebitz | 524/495 |
| 2003/0036598 A1 | * | 2/2003 | Yamasa et al. | 524/495 |

FOREIGN PATENT DOCUMENTS

| | | |
|---|---|---|
| EP | 0153415 | 9/1985 |
| EP | 0499723 | 8/1992 |
| EP | 0576971 | 1/1994 |
| EP | 0673964 | 9/1995 |
| EP | 0739941 | 10/1996 |
| FR | 2528057 | 12/1983 |
| JP | 6-41389 | 2/1994 |
| JP | 6-57054 | 3/1994 |
| JP | 8-48816 | 2/1996 |
| JP | 2521380 | 5/1996 |
| JP | 2566469 | 10/1996 |
| JP | 2622891 | 4/1997 |
| JP | 3031986 | 2/2000 |
| JP | 2001-294760 | 10/2001 |
| JP | 2002-3691 | 1/2002 |
| JP | 2002-20560 | 1/2002 |
| JP | 2002-249635 | 9/2002 |
| WO | WO 01/48083 A1 * | 7/2001 |

OTHER PUBLICATIONS

European Search Report dated Feb. 2, 2005.

* cited by examiner

*Primary Examiner*—Vasu Jagannathan
*Assistant Examiner*—Rip A. Lee
(74) *Attorney, Agent, or Firm*—Edwards Angell Palmer & Dodge LLP

(57) ABSTRACT

A polypropylene-based resin composition of drastically improved dimensional stability realized by incorporating a polypropylene resin of specific structure with an inorganic filler of specific particle size, carbon fibers of specific fiber diameter and length, and, as required, an ethylene- and/or styrene-based elastomer. Another polypropylene-based resin composition of well-balanced properties of rigidity, heat-resistance, impact resistance and lightness even essentially in the absence of inorganic filler, realized by compositing a propylene/ethylene block copolymer of specific structure and well-balanced mechanical properties with an ethylene- and/or styrene-based elastomer, and carbon fibers of specific structure.

8 Claims, No Drawings

POLYPROPYLENE-BASED RESIN COMPOSITION AND MOLDED ARTICLE THEREOF

BACKGROUND OF THE INVENTION

1. Field of the Invention

The present invention relates to a polypropylene-based resin composition excellent in dimensional stability and molded article thereof, more specifically a polypropylene-based resin composition excellent in dimensional stability and, at the same time, well-balanced in linear expansion coefficient, fluidity, rigidity, impact resistance and lightness, and molded article thereof.

The present invention also relates to a polypropylene-based resin composition excellent in recyclability, more specifically a polypropylene-based resin composition well-balanced in mechanical properties (e.g., rigidity, heat resistance and impact resistance) and excellent in lightness, and molded article thereof.

2. Description of the Prior Art

Polypropylene is a thermoplastic resin easily molded, and excellent in rigidity, heat resistance, impact resistance and recyclability. As such, it has found wide uses in automobile parts, e.g., bumpers, instrument panels and door trims. More recently, its applications are expanding into areas where metals, e.g., iron, have been predominant.

Polypropylene is higher in shape freedom but lower in dimensional stability than metallic materials. In particular, it has been finding outdoor uses subject to large temperature fluctuations, e.g., automobile external plates, and causes problems, e.g., deteriorated quality at gaps and waving, to damage vehicle outer appearances.

Therefore, it has been incorporated with an inorganic filler, e.g., talc, calcium carbonate or mica, or elastomer component, in order to improve its dimensional stability, described above, and moldability, mechanical properties and outer appearances, among others. These attempts, however, have failed to produce sufficient effects.

Moreover, incorporation of low-viscosity rubber has been proposed to facilitate orientation of the rubber component in the polypropylene matrix (JP-A 2002-249635). This effect, however, is still insufficient.

Still more, methods have been proposed to further improve dimensional stability of polypropylene by combining talc with whiskers of potassium titanate or the like (JP 2,521,380, 2,566,469 and 2,622,891). However, their products are still insufficient in dimensional stability when they are to be used as substitutes for metals, because linear expansion coefficient which they can attain is limited to 3 to $4 \times 10^{-5}$ cm/cm° C. or so. Therefore, polypropylene has been still demanded to be further improved in dimensional stability.

These related art techniques intentionally incorporate a low-viscosity rubber component to control linear expansion coefficient. A low-viscosity rubber, although effectively controlling linear expansion coefficient, deteriorates performance with respect to impact resistance. Therefore, development of polypropylene of well-balanced impact resistance and dimensional stability has been demanded.

Demands for polypropylene have been steadily growing worldwide, which has brought major challenges of recycling for reutilization/reuse of spent polypropylene products. For the products which are required to have a high rigidity, e.g., automobile bumpers, polypropylene is incorporated with an inorganic filler, represented by talc, to realize a target rigidity (JP 3,031,986, and JP-A 6-57054, 2002-20560 and 2002-3691).

Compositing polypropylene with an inorganic filler invariably increases its density, which counters trends towards reducing weight. At the same time, ashes are produced when the spent products are incinerated, which impedes recycling of polypropylene for heat sources. Techniques for compositing polypropylene with carbon fibers are known. However, carbon fibers are not well dispersed in the polypropylene resin matrix. The general countermeasures to improve the dispersion include incorporation of a modified resin, e.g., modified polypropylene, and pretreatment of carbon fibers with a special resin for surface modification or the like (JP-A 8-48816, 6-41389 and 2001-294760).

Use of a modified resin for the above purpose tends to deteriorate excellent properties a polypropylene resin inherently has, e.g., rigidity and impact resistance, and is not recommended for products which are required to have high rigidity and impact resistance, e.g., those for automobiles. On the other hand, carbon fibers, when incorporated in the polypropylene matrix, are easily cut to become too short in the composite to improve rigidity. Therefore, carbon fibers are difficult to sufficiently exhibit their effects at a normal content.

SUMMARY OF THE INVENTION

It is an object of the present invention to provide a polypropylene-based resin composition having dimensional stability which the conventional compositions cannot attain, and excellent in moldability, rigidity, impact resistance and lightness, in consideration of the above problems. It is another object to provide a molded article of the same composition.

It is still another object to provide a polypropylene-based resin composition low in density, well-balanced in rigidity, heat resistance, impact resistance and lightness, and excellent in recyclability, even essentially in the absence of inorganic filler. It is still another object to provide a molded article of the same composition.

The inventors of the present invention have found, after having extensively studied a polypropylene-based resin composition excellent in dimensional stability to solve the above problems, that a polypropylene composition of specific structure can have drastically improved dimensional stability when incorporated with an inorganic filler having a specific particle size, carbon fibers having specific diameter and length, and, as required, an ethylene- and/or styrene-based elastomer, achieving the present invention.

They have also found, after having extensively studied a polypropylene-based resin composition exhibiting well-balanced rigidity, heat resistance, impact resistance and lightness even essentially in the absence of an inorganic filler, which works as an obstacle to reducing weight, that a polypropylene-base resin composition can have well-balanced rigidity, heat resistance, impact resistance and lightness even essentially in the absence of an inorganic filler, and is composited with a specific propylene block copolymer having well-balanced mechanical properties, ethylene- and/or styrene-based elastomer and carbon fibers having a specific structure, achieving the present invention.

Carbon fibers should have a certain length to secure a high rigidity and impact resistance of the polypropylene composition in which they are incorporated, because these properties cannot be realized by short fibers, e.g., those called whiskers. At the same time, it is necessary, when carbon fibers of certain fiber length are used, to keep the original fiber length as far as possible by preventing breaking of the fibers in a melting/kneading step for compositing polypropylene. One of the measures is to reduce load resulting from shear stress in the melting/kneading step. This needs control propylene properties, e.g., degree of crystallization, glass transition temperature and melt flow rate as a measure of fluidity, and a special design to cope with interactions of the compositing components to deteriorate fluidity resulting from the elastomer component incorporated to improve impact resistance. The inventors of the present invention have made a broad-ranging analysis of the balances between the individual characteristics of the three major compositing components (i.e., propylene block copolymer, elastomer and carbon fibers) and their interactions, and also paid technical considerations to sophisticated melt conditions in the melting/kneading step for compositing these three components, in order to provide a resin composition exhibiting excellent properties, e.g., impact resistance, rigidity and fluidity, and a molded article thereof.

The first aspect of the present invention is a polypropylene-based resin composition comprising the following components (A) to (C):

(A): propylene homopolymer having a melt flow rate (hereinafter referred to as MFR) of 10 g/10 minutes or more and isotactic pentad fraction of 98.0% or more, and/or propylene block copolymer having a melt flow rate of 30 g/10 minutes or more and composed of a propylene homopolymer portion and copolymer portion of propylene and another α-olefin, the propylene homopolymer portion having an isotactic pentad fraction of 98% or more, and the copolymer portion containing propylene at 30 to 85% by weight and having a weight-average molecular weight of 400,000 or more: 50% by weight or more but less than 99.5% by weight, (B): at least one species of inorganic filler selected from the group consisting of talc, calcium carbonate, natural mica, synthetic mica, wollastonite and montmorillonite, having an average particle size of 10 μm or less, determined by laser diffractometry: more than 0% by weight but 30% by weight or less, and (C): carbon fibers having a fiber diameter of 2 to 15 μm and fiber length of 0.1 to 20 mm: 0.5 to 20% by weight.

The second aspect of the present invention is the polypropylene-based resin composition according to the first aspect, wherein the components (A) to (C) satisfy the following conditions:

(A): the propylene block copolymer which has the copolymer portion containing propylene at 30 to 65% by weight: 60 to 94% by weight, (B): the inorganic filler: 5 to 30% by weight, and (C): the carbon fibers having a fiber diameter of 3 to 15 μm: 1 to 10% by weight.

The third aspect of the present invention is a polypropylene-based resin composition comprising the following components (A) to (D):

(A): propylene homopolymer having an MFR of 10 g/10 minutes or more and isotactic pentad fraction of 98.0% or more, and/or propylene block copolymer having an MFR of 30 g/10 minutes or more and composed of a propylene homopolymer portion and copolymer portion of propylene and another α-olefin, the propylene homopolymer portion having an isotactic pentad fraction of 98% or more, and the copolymer portion containing propylene at 30 to 85% by weight and having a weight-average molecular weight of 400,000 or more: 10% by weight or more but less than 94.5% by weight, (B): at least one species of inorganic filler selected from the group consisting of talc, calcium carbonate, natural mica, synthetic mica, wollastonite and montmorillonite, having an average particle size of 10 μm or less, determined by laser diffractometry: more than 0% by weight but 30% by weight or less, (C): carbon fibers having a fiber diameter of 2 to 15 μm and fiber length of 0.1 to 20 mm: 0.5 to 20% by weight, and (D): ethylene- and/or styrene-based elastomers having an MFR of 0.1 to 20 g/10 minutes and density of 0.850 to 0.910 g/cm$^3$: 5 to 50% by weight.

The fourth aspect of the present invention is the polypropylene-based resin composition according to the third aspect, wherein the components (A) to (D) satisfy the following conditions:

(A): the propylene block copolymer which has the copolymer portion containing propylene at 30 to 65% by weight: 10 to 89% by weight, (B): the inorganic filler: 5 to 30% by weight, (C): the carbon fibers having a fiber diameter of 3 to 15 μm: 1 to 10% by weight, and (D): the ethylene- and/or styrene-based elastomers: 5 to 50% by weight.

The fifth aspect of the present invention is a polypropylene-based resin composition comprising the following components (A), (C) and (D), and having a density below 1.00 g/cm$^3$:

(A): propylene block copolymer having an MFR of 50 to 150 g/10 minutes and composed of a propylene homopolymer portion and copolymer portion of propylene and another α-olefin, the propylene homopolymer portion having an isotactic pentad fraction of 98% or more, and the copolymer portion containing propylene at 45 to 85% by weight, and having a glass transition temperature of −40° C. or lower and weight-average molecular weight of 500,000 to 2,000,000: 30 to 95% by weight, (C): carbon fibers having a fiber diameter larger than 2 μm but 15 μm or less and fiber length of 1 to 20 mm: 0.5 to 20% by weight, and (D): ethylene- or styrene-based elastomer having an MFR of 0.1 to 20 g/10 minutes and density of 0.850 to 0.910 g/cm$^3$: 5 to 50% by weight.

The sixth aspect of the present invention is the polypropylene-based resin composition according to one of the third to sixth aspects, wherein the ethylene-based elastomer as the component (D) is at least one species of copolymer selected from the group consisting of ethylene/propylene, ethylene/butene and ethylene/octene copolymers, and contains the comonomer component copolymerized with ethylene at 10 to 50% by weight.

The seventh aspect of the present invention is the polypropylene-based resin composition according to one of the third to fifth aspects, wherein the styrene-based elastomer as the component (D) is a styrene-based, hydrogenated block copolymer rubber of the following structure containing the segment A having a polystyrene structure at 1 to 25% by weight:

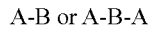

A-B or A-B-A wherein, A is a segment of polystyrene structure, and B is a segment of ethylene/butene or ethylene/propylene structure.

The eighth aspect of the present invention is the polypropylene-based resin composition according to one of the first to fourth, sixth and seventh aspects which has an MFR of 10 to 130 g/10 minutes, linear expansion coefficient at 23 to 80° C. is $0.1 \times 10^{-5}$ cm/cm° C. or more but less than $3 \times 10^{-5}$ cm/cm° C., density of 0.91 to 1.2 g/cm$^3$, flexural modulus of 2000 MPa or more, and Izod impact strength of 200 J/m or more at 23° C. and 40 J/m or more at −30° C.

The ninth aspect of the present invention is the polypropylene-based resin composition according to one of the fifth to seventh aspects which has an MFR of 10 to 130 g/10 minutes, flexural modulus of 1400 to 6000 MPa, Izod impact strength of 400 J/m or more at 23° C. and 50 J/m or more at −30° C., a tensile elongation of 200% or more, and deflection temperature of 80° C. or higher under a load of 0.45 MPa.

The 10$^{th}$ aspect of the present invention is a pellet of the polypropylene-based resin composition according to one of the first to seventh aspects, wherein the carbon fibers incorporated therein have an average length of 0.05 mm or more but less than 20 mm.

The 11$^{th}$ aspect of the present invention is a molded article of the polypropylene-based resin composition according to one of the first to ninth aspects, produced by a molding method selected from the group consisting of injection molding, compression molding and injection compression molding.

The 12$^{th}$ aspect of the present invention is the molded article of the polypropylene-based resin composition according to the 11$^{th}$ aspect, wherein the carbon fibers incorporated therein have an average length of 0.05 mm or more but less than 20 mm.

The 13$^{th}$ aspect of the present invention is the molded article of the polypropylene-based resin composition according to the 11$^{th}$ aspect, wherein the carbon fibers incorporated therein have an average length of 0.3 mm or more but less than 20 mm.

The 14$^{th}$ aspect of the present invention is the molded article of the polypropylene-based resin composition according to one of the 11$^{th}$ to 13$^{th}$ aspects which is used as an automobile part, housing for home electric/electronic appliances or building part.

The polypropylene-based resin composition of the present invention is well-balanced in various properties, e.g., dimensional stability, moldability, rigidity, impact resistance and lightness while keeping high fabricability as an inherent property of a polypropylene resin. As such, the resin composition composed of a light material of polypropylene as the major component enables to produce parts, for which metallic materials have been used exclusively, and can be molded into important part shapes, e.g., automobile parts, housings for home electric/electronic appliances and building parts.

The polypropylene-based resin composition of the present invention has well-balanced properties even essentially in the absence of an inorganic filler, which causes production of ashes when incinerated, and is hence well-balanced between thermal recyclability and other properties. Therefore, it has sufficient practical performance as a material to be molded for various parts of industrial products, e.g., automobile parts which have been increasingly consumed year by year, in particular bumpers, fenders, instrument panels, garnishes and the like, which have been demanded to be thinner, more functional and larger, and home electric/electronic appliance parts, e.g., TV set cases. Moreover, it is free of inorganic filler, which has a higher density than polypropylene, and can be expected to bring an effect of improving mileage, when used for automobiles, resulting from reduced body weight.

Still more, polypropylene as a thermoplastic resin is a suitable material for material recycling, because it is inherently recyclable for repeated use. The polypropylene-based resin composition of the present invention, being free of inorganic filler, becomes more advantageous for recycling and is of high industrial value viewed from protection of global environments.

The polypropylene-based resin composition of the present invention is highly fluid at a molding temperature and uniformly spreads into every corner of the mold. Therefore, it can be molded into shapes of various sizes by, e.g., a multi-cavity mold for injection molding, from small-size products to large-size ones, e.g., bath tubs, automobile bumpers and bonnets, and housings. Its viscoelasticity tends to decrease at a characteristic molding temperature for polypropylene resin, which orients the incorporated carbon fibers more unidirectionally along flow direction of the composition, to greatly increase composition strength. This is a characteristic effect not observed with a composition incorporated with talc, silica or calcium carbonate as a common additive, by which is meant that the present invention includes an embodiment of polypropylene-based resin composition containing oriented carbon fibers.

DETAILED DESCRIPTION OF THE INVENTION

The polypropylene-based resin composition of the present invention is composed of a polypropylene resin (A) and carbon fibers (C) as the essential components, and inorganic filler (B) and/or ethylene- and/or styrene-based elastomer (D) optionally incorporated depending on the problems to be solved by the present invention. The constituent components, resin properties, method for producing the composition, and molded article of the composition are described in detail.

1. Constituent Components of the Polypropylene-Based Resin Composition (A) Polypropylene Resin The polypropylene resin as the component (A) for the polypropylene-based resin composition of the present invention means a (i) propylene homopolymer and/or (ii) propylene block copolymer.

(i) Propylene Homopolymer

The propylene homopolymer (i) as the polypropylene resin for the present invention has an MFR of 10 g/10 minutes or more, preferably 20 g/10 minutes or more, more preferably 30 to 200 g/10 minutes. An MFR beyond the above range is not desirable. The resin composition may have insufficient fluidity at below 10 g/10 minutes, and may become fragile at above 200 g/10 minutes.

The MFR level can be adjusted by controlling hydrogen concentration during the polymerization process, or cutting the molecular chains by the aid of an organic peroxide or the like while the polymer powder is molten/kneaded by an extruder or the like.

MFR is determined at 230° C. in accordance with JIS K-7210.

The propylene homopolymer (i) has an isotactic pentad fraction of 98.0% or more, preferably 98.0 to 99.5%, more preferably 98.5 to 99.5%. An isotactic pentad fraction beyond the above range is not desirable. The composition may have not only a deteriorated rigidity resulting from simple stereoregularity but also a deteriorated tenacity in the interface in which polypropylene comes into contact with carbon fibers or inorganic filler, limiting reflection of the reinforcing effect by carbon fibers or inorganic filler, later described, in the whole composition. This will synergistically deteriorate rigidity and heat resistance of the resin composition.

Isotactic pentad fraction can be adjusted by controlling dose rate of an electron donor (external and/or internal donor) of polymerization catalyst, or preventing loss of the donor in the polymerization process to control steric configuration of the side chain.

Isotactic pentad fraction is an isotactic fraction of a pentad unit in the polypropylene molecular chain, determined by $^{13}$C-NMR described in Macromolecules, 6, 925 (1973). In other words, it is a fraction of a propylene monomer unit at the center of a sequence of 5 meso-bonded propylene monomer units connected to each other. Peak attribution is performed by the procedure described in Macromolecules, 8, 687 (1975). More specifically, the isotactic pentad unit is determined as an mmmm peak intensity fraction on the total absorption peaks in the methyl carbon region in the $^{13}$C-NMR spectral pattern.

(ii) Propylene Block Copolymer

The propylene block copolymer (ii) as the polypropylene resin for the present invention is composed of a propylene homopolymer portion and copolymer portion of propylene and another α-olefin.

The monomer to be copolymerized with propylene for the copolymer portion of the block copolymer may be optionally selected from α-olefins, e.g., ethylene, butene, pentene, hexene and octene, of which ethylene, butene and octene are more preferable viewed from their compatibility with a propylene homopolymer and toughness, and ethylene is still more preferable.

The propylene block copolymer has an MFR of 30 g/10 minutes or more, preferably 30 to 200 g/10 minutes, more preferably 50 to 150 g/10 minutes. An MFR below 30 g/10 minutes is not desirable, because the resin composition may have insufficient fluidity.

The copolymer having an MFR of 50 g/10 minutes or more is preferable, because it can control breaking of the carbon fibers during the melting/kneading step, and solve problems resulting from deteriorated fluidity of the polypropylene resin composition, when the elastomer component (D) is incorporated to improve its impact resistance. An MFR above 150 g/10 minutes is not desirable, because dispersibility of the elastomer component (D) may decrease to deteriorate impact resistance and ductility of the composition.

The homopolymer portion has an isotactic pentad fraction of 98.0% or more, preferably 98.0 to 99.5%, more preferably 98.5 to 99.5%. An isotactic pentad fraction beyond the above range is not desirable, because it may cause the same problems as discussed above in (i).

The homopolymer portion has an MFR of 35 to 400 g/10 minutes, preferably 40 to 350 g/10 minutes, more preferably 45 to 300 g/10 minutes. An MFR beyond the above range is not desirable, because the resin composition may have insufficient fluidity, or impact resistance and toughness.

MFR is determined at 230° C. in accordance with JIS K-7210.

The copolymer portion of propylene and another α-olefin contains propylene at 30 to 85% by weight, preferably 35 to 65%, more preferably 40 to 63%. The propylene content beyond the above range is not desirable, because the copolymer portion may have deteriorated dispersibility or increased glass transition temperature.

The propylene content of the copolymer portion can be adjusted by controlling propylene/α-olefin concentration ratio during the copolymerization process. The propylene content may be determined by a known analytical procedure, e.g., infrared spectroscopy or $^{13}$C-NMR.

The copolymer portion has a weight-average molecular weight of 400,000 or more, preferably 500,000 to 2,000,000, more preferably 600,000 to 1,500,000. The average-molecular weight beyond the above range is not desirable, because of anticipated deterioration in fluidity of the resin composition or in dispersibility of the copolymer portion.

The molecular weight of the copolymer portion can be adjusted by controlling hydrogen concentration during the copolymerization process.

The weight-average molecular weight is determined by gel permeation chromatography (GPC).

The molecular weight was estimated from the held volume using a calibration curve prepared beforehand.

For preparation of the calibration curve, polystyrenes F380, F288, F128, F80, F40, F20, F10, F4, F1, A5000, A2500 and A1000, all supplied by Tosoh Corp. were used as the standard polystyrenes, where each was dissolved in ODCB (containing BHT at 0.5 mg/mL) at 0.5 mg/mL, and 0.2 mL was injected into the GPC. The calibration curve was represented by a cubic equation, determined by approximation by the least square method.

In the viscosity equation $[\eta]=K\times M^{\alpha}$ used for estimation of the molecular weight, the following numerals were used for K and α:
PS: $K=1.38\times10^{-4}$, $\alpha=0.78$
PP: $K=1.03\times10^{-4}$, $\alpha=0.78$ The GPC conditions are summarized below:
Chromatograph: Waters GPC (ALC/GPC, 150C)
Detector: FOXBORO MIRAN 1A IR detector (measurement wavelength: 3.42 μm)
Column: Showa Denko AD806M/S (3 columns)
Mobile phase solvent: o-dichlorobenzene (ODCB)
Measurement temperature: 140° C.
Flow rate: 1.0 mL/minute
Quantity of sample injected: 0.2 mL
Sample preparation: Each of the GPC feed was dissolved in ODCB (containing BHT at 0.5 mg/mL) to 1.0 mg/mL at 140° C. in around 1 hour.

The block copolymer preferably contains the copolymer portion at 3 to 50% by weight. The content beyond the above range is not desirable. At below 3% by weight, incorporation of the copolymer portion may be essentially meaningless. At above 50% by weight, the resin composition may have deteriorated rigidity, heat resistance and fabricability.

Concentration of the copolymer portion can be adjusted by controlling propylene homopolymer portion/copolymer portion polymerization ratio and polymerization time while the block copolymer is being copolymerized.

Concentration of the copolymer portion can be determined by a known common procedure, e.g., infrared spectroscopy, $^{13}$C-NMR or temperature-programmed elution/isolation method.

The copolymer portion of the block copolymer preferably has a glass transition temperature of −40° C. or lower, more preferably −40 to −60° C., still more preferably −41 to −55° C. A glass transition temperature higher than −40° C. is not desirable, because the copolymer may have impact resistance rapidly deteriorating at low temperature.

Glass transition temperature of the copolymer portion can be adjusted by controlling propylene/copolymer monomer copolymerization ratio. It can be determined by a dynamic solid viscoelasticity analyzer.

The propylene homopolymer (i) and propylene block copolymer (ii), described above, can be produced by a method optionally selected from the known ones, e.g., vapor-phase, bulk, solution and slurry polymerization. They may be produced batchwise in one reactor, or continuously in 2 or more reactors connected to each other. More specifically, a crystalline propylene homopolymer is produced first by propylene homopolymerization. When it is to be used as the homopolymer for the present invention, it is withdrawn from the reaction system to be directly used as the homopolymer. When it is to be further polymerized to have a block copolymer, the homopolymerization is preferably followed by random copolymerization to produce the copolymer portion of propylene with another α-olefin.

The polymerization catalyst for producing the propylene homopolymer and propylene block copolymer for the present invention is not limited, so long as it gives a polymer having the properties described earlier (MFR and isotactic pentad fraction). A specific Ziegler-Natta (ZN) catalyst or metallocene catalyst may be selected from known catalysts of high stereoregularity.

The so-called ZN catalyst is one example of high-stereoregularity catalysts. It is composed of a solid component (component "a") comprising titanium, magnesium or a halogen and a specific electron donorable compound as the essential components, organoaluminum compound (component "b"), e.g., triethyl aluminum, and electron donorable compound (component "c") as an optional component.

The specific electron donorable compounds useful as the component "c" include organic silicon alkoxy compounds, e.g., t-butyl-methyl-dimethoxysilane; 1,3-diethers, e.g., 2,2-diisopropyl-1,3-diether; and polyvalent carboxylic acid esters, e.g., butyl phthalate, octyl phthalate and dibutyl 1,2-diisopropylsuccinic acid. They may be used either individually or in combination.

A metallocene catalyst is the so-called metallocene catalyst composed of a metallocene complex (component "a'") and organoaluminumoxy compound, Lewis acid, anionic compound or promoter component of clay mineral (component "b'").

Next, the metallocene catalyst is described. Metallocene compounds useful as the component "a'" for the catalyst include transition metal (Group 4) compounds of substituted or unsubstituted cyclopentadiene, indene, fluorene or azulene having a carbon, silicon or germanium crosslink, as a ligand.

The promoters useful as the component "b'" for the catalyst include organoaluminumoxy compounds, e.g., methyl aluminoxane; Lewis acid, e.g., triphenyl borane; ionic compounds, e.g., dimethylanilinium tetrakis (pentafluorophenyl) borate, and clay mineral, e.g., montmorillonite.

Concentrations of the components (a), (b) and (c) in production of the propylene homopolymer or propylene block copolymer for the present invention are not limited, so long as the effects of the present invention are realized. In general, however, they are preferably in the following ranges: component (a): 0.01 to 1000 mol.ppm; component (b): 0.1 to 10000 mol.ppm on propylene supplied to the reactor, more preferably 1 to 1000 mol.ppm, still more preferably 10 to 300 mol.ppm; and component (c): 0 to 100 mol.ppm on propylene supplied to the reactor, more preferably 0 to 50 mol.ppm, still more preferably 0 to 20 mol.ppm.

When a metallocene catalyst is used, concentrations of the components (a') and (b') are generally in the following ranges: component (a'): 0.001 to 100 mol.ppm; and component (b'): 10 to 100000 mols per mol of the component (a').

(B) Inorganic Filler

An inorganic filler used as the optional component (B) for the polypropylene-based resin composition of the present invention is at least one species selected from the group consisting of talc, calcium carbonate, natural mica, synthetic mica, wollastonite and montmorillonite, of which talc and calcium carbonate are more preferable.

Incorporation of an inorganic filler effectively improves rigidity and dimensional stability of the polypropylene-based resin composition of the present invention, but runs counter to the object of reducing weight. Therefore, it is preferable that the component (B) is incorporated positively when preference is given to rigidity or dimensional stability over reducing weight.

The inorganic filler for the present invention has an average particle size of 10 μm or less, determined by laser diffractometry, preferably 0.5 to 8 μm. An average size above 10 μm is not desirable, because the filler may have a deteriorated effect of controlling linear expansion coefficient.

The average particle size of the inorganic filler may be determined by a laser diffractometer (e.g., Horiba's LA920W), where the level at cumulative 50% by weight in a particle size cumulative distribution curve is taken as the average size.

The inorganic filler is finely crushed by a mechanical means and then classified more precisely for the present invention. The classification procedure may be carried out 2 or more times. The mechanical means include crushers, e.g., jaw crusher, hammer crusher, roll crusher, screen mill, jet crusher, colloid mill, roller mill and vibration mill. The mechanically crushed inorganic filler is classified once or more times to have a desired average size for the present invention by a wet or dry classifier, e.g., cyclone, cyclone/air separator, microseparator or sharp-cut separator.

The inorganic filler for the present invention is preferably crushed to a specific size and then classified by a sharp-cut separator. The inorganic filler may be surface-treated with a varying organic titanate-based coupling agent, organic silane-based coupling agent, unsaturated carboxylic acid, graft-modified polyolefin produced from an anhydride thereof, fatty acid, metallic salt of fatty acid, fatty acid ester or the like, to accelerate its adhesion to or dispersion in the polypropylene resin.

(C) Carbon Fibers

Carbon fibers used as the component (C) for the polypropylene-based resin composition of the present invention should have a fiber diameter of 2 to 15 μm, preferably 3 to 15 μm, and fiber length of 0.1 to 20 mm, preferably 1 to 20 mm. A fiber diameter beyond the above range is not desirable. When it is below 21 m, the fibers may have a significantly deteriorated rigidity. When it is above 15 μm, on the other hand, the fibers may have a lowered aspect ratio (diameter/length ratio) to cause deteriorated effect of reinforcing the resin composition. A fiber length beyond the above range is also not desirable. When it is below 0.1 mm, the fibers may not exhibit a sufficient effect of reinforcing the resin composition, resulting from insufficient aspect ratio. When it is above 20 mm, on the other hand, the resin composition may have significantly deteriorated fabricability and outer appearances.

When the resin composition is used to reduce weight of the resin parts for automobiles or the like, in particular, incorporation of an inorganic filler is not desirable because of its high density, and carbon fibers to be incorporated as the component (C) for the resin composition have an initial length of 1 mm or more, and a final length (residual fiber length) of 0.3 mm or more after the resin is molten and kneaded, because the resin needs effective reinforcement for rigidity by carbon fibers.

When preference is given to rigidity or dimensional stability over reducing weight, on the other hand, the resin is incorporated with an inorganic filler, e.g., talc, and hence the fibers preferably have an initial length of 0.1 mm or more and a final length of 0.05 mm or more.

The fibers may have a deteriorated reinforcing efficiency, when their initial and final lengths are below the above levels.

Carbon fibers may be pitch-based from tar pitch or PAN-based from polyacrylonitrile as the main starting materials, respectively. They may be used simultaneously. However, PAN-based fibers are more suitable, viewed from purity, uniformity and the like.

The shape parameters (fiber diameter and fiber length) of carbon fibers are particularly important for the polypropylene-based resin composition of the present invention. JP 2,521,380 proposes incorporation of potassium titanate whiskers, e.g., potassium titanate, as a fibrous filler together with an inorganic filler to improve dimensional stability of a polypropylene resin. However, this whisker is too fine (diameter: 2 μm or less) to have a sufficient rigidity, with the result that linear expansion coefficient of the resin composition incorporated therewith decreases only to 4 to 5($\times 10^{-5}$ cm/cm° C.) or so. Therefore, the resin composition has insufficient dimensional stability to replace metallic materials.

JP 2,566,469 and 2,622,891 similarly propose incorporation of whiskers, e.g., potassium titanate whiskers, as a fibrous filler together with an extender, e.g., talc, to improve dimensional stability of a polypropylene resin. These fibrous fillers, having a length of 1 to 50 μm, apparently have a lower aspect ratio than that for the present invention, with the result that linear expansion coefficient of the resin composition incorporated therewith decreases only to 3 to 4($\times 10^{-5}$ cm/cm° C.) or so. Therefore, the resin composition has insufficient dimensional stability to replace metallic materials.

The polypropylene-based resin composition of the present invention is developed to realize dimensional stability far exceeding than that attainable by conventional techniques, and linear expansion coefficient on a level with that of metallic materials, e.g., iron.

The inventors of the present invention have extensively studied to achieve the above object mainly by a combination of fibrous and inorganic fillers with filler species and shape taken as the important parameters.

As a result, they have found that the fibrous filler exhibits a significant effect of controlling linear expansion coefficient of the resin composition in which it is incorporated, when it is thicker (and hence more tenacious) and longer (of the order of several millimeters) than those thin and having a length of several tens microns or less, disclosed by the cited patent documents in their embodiments.

The constitutions of the present invention also include particle size of the inorganic filler and polypropylene resin structure as the necessary conditions, in addition to selection of the fibrous filler. However, selection of adequate shape factors of the fibrous filler is an essential requirement for the present invention.

As stressed above, shape of the carbon fibers for the present invention is an essential condition for the polypropylene-based resin composition of the present invention. Of those carbon fibers satisfying the required shape factors, PAN-based fibers from polyacrylonitrile are more preferable than pitch-based ones because they can realize higher dimensional stability for the resin composition. This conceivably results from higher purity of the starting material for the former, which is not fully substantiated, though.

The carbon fibers can be used in the form of the so-called chopped carbon fibers, for which the original yarns are cut to a desired length. They may be treated, as required, with a varying sizing agent for convergence. The sizing agent for the above purpose preferably melts at 200° C. or lower, because it should melt while the polypropylene resin in which it is incorporated is molten and kneaded.

The chopped carbon fibers may be linear in shape, or curly. The commercial products fibers include Toray's "TORAYCA CHOPS," Mitsubishi Rayon's "PYROFIL (chopped)" and Toho Tenax's "BESFIGHT (chopped)" as PAN-based ones, and Mitsubishi Chemical Functional Products' "DIALEAD," Osaka Gas Chemicals' "DONACARBO" and Kureha's "Kreca Chop" as pitch-based ones.

(D) Elastomer

The polypropylene-based resin composition of the present invention may be incorporated, as required, with an ethylene-based and/or styrene-based elastomer as the component (D) to improve impact resistance or the like.

The ethylene-based or styrene-based elastomer for the present invention preferably has an MFR of 0.1 to 20 g/10 minutes, more preferably 0.1 to 15 g/10 minutes, still more preferably 0.2 to 10 g/10 minutes. An MFR beyond the above range is not desirable. The elastomer may have deteriorated dispersibility at below 0.1 g/10 minutes to decrease impact resistance of the resin composition in which it is incorporated. At above 20 g/10 minutes, on the other hand, the elastomer may deteriorate in its own toughness to decrease impact resistance of the resin composition, resulting from reduced extent of entwining of the elastomer molecule chains with each other.

MFR is determined at 230° C. in accordance with JIS K-7210.

The elastomer, when incorporated in the polypropylene-based resin composition of the present invention, should sufficiently cover deteriorated impact resistance of the composition caused by carbon fibers, and have an MFR in the above range. It is known that sufficiently orienting an elastomer component is effective for controlling linear expansion coefficient. This needs to reduce viscosity of the elastomer component. Incorporation of such an elastomer, although effective for decreasing linear expansion coefficient, has a negative effect on impact resistance of the composition. The polypropylene-based resin composition is incorporated with tenacious, long carbon fibers as the fibrous filler, which greatly deteriorate impact resistance of the composition. When combined with an inorganic filler of fine particles, the carbon fibers can drastically decrease linear expansion coefficient of the composition, and realize high dimensional stability as the objective of the present invention, even when the elastomer component is insufficiently oriented in the composition. Viewed from this angle, conventional techniques have generally incorporated a low-viscosity elastomer to reduce linear expansion coefficient. The present invention conversely incorporates a high-viscosity elastomer, which is an important consideration for realizing better-balanced impact resistance and dimensional stability.

An MFR of the propylene block copolymer below 30 g/10 minutes is not desirable, because the copolymer may deteriorate fluidity of the resin composition as it is incorporated with carbon fibers and the elastomer component for improving impact resistance.

The elastomer preferably has a density of 0.850 to 0.910 g/cm$^3$, more preferably 0.855 to 0.910 g/cm$^3$. A density beyond the above range is not desirable. A density below 0.850 g/cm$^3$ may greatly deteriorate elastomer handleability, and above 0.910 g/cm$^3$ may not sufficiently secure elastomer effect of improving impact resistance.

Density is determined by the Archimedean method in accordance with JIS 7112.

An ethylene-based elastomer, when used as the component (D) for the present invention, is preferably selected from the group consisting of ethylene/propylene, ethylene/butene and ethylene/octene copolymers, of which ethylene/butene and ethylene/octene copolymers are particularly preferable. The ethylene-based elastomer preferably contains the comonomer to be copolymerized with ethylene at 10 to 50% by weight. A content beyond the above range is not desirable. At below 10% by weight, the elastomer may not sufficiently exhibit rubber elasticity. At above 50% by weight, on the other hand, it may have deteriorated impact resistance at low temperature, resulting from increased glass transition temperature.

The ethylene-based elastomer can be produced by a common polymerization process, e.g., vapor-phase fluidized bed, solution, slurry or high-pressure process. It may contain a small quantity of copolymerized diene component, e.g., dicyclopentadiene or ethylidenenorbornene.

The polymerization catalyst for producing the ethylene-based elastomer may be the so-called Ziegler catalyst composed of a titanium compound (e.g., titanium halide) or vanadium compound and organoaluminum/magnesium complex (e.g., alkyl aluminum/magnesium or alkyl alkoxyaluminum/ magnesium complex) or organometallic compound (e.g., alkyl aluminum or alkyl aluminum chloride); or a metallocene catalyst, e.g., that disclosed by WO-91/04257. The catalyst referred to as metallocene catalyst preferable for the present invention is the so-called Kaminski catalyst composed of a metallocene catalyst and alumoxane, although alumoxane is not essential.

A styrene-based elastomer, when used as the component (D) for the present invention, is a styrene-based, hydrogenated block copolymer rubber having a structure described below which should contain Segment A having a polystyrene structure at 1 to 25% by weight, A-B or A-B-A wherein, A is a segment of polystyrene structure, and B is a segment of ethylene/butene or ethylene/propylene structure.

A styrene-based elastomer is essentially not regarded as styrene-based, when it's Segment A content below 1% by weight. When it exceeds 25% by weight, on the other hand, the elastomer may not be sufficiently dispersed because of significantly deteriorated compatibility with the polypropylene resin.

Content of the polystyrene structure unit may be determined by a common analytical procedure, e.g., infrared spectroscopy or $^{13}$C-NMR.

More specifically, the styrene-based, hydrogenated block copolymer rubbers useful for the present invention include styrene/ethylene/butene/styrene (SEBS) copolymer and styrene/ethylene/propylene/styrene (SEPS) copolymer. The elastomer copolymer having the block structure may be a mixture of the tri- and di-block structures, described above. The block copolymer can be produced by a common anion living polymerization process, where styrene, butadiene and styrene are polymerized consecutively to form a tri-block structure and then hydrogenated (production of SEBS), or a di-block copolymer of styrene and butadiene is first produced, transformed into a tri-block structure in the presence of a coupling agent, and then hydrogenated. Butadiene may be replaced by isoprene to produce a hydrogenated tri-block structure of styrene/isoprene/styrene.

(E) Other Components

The polypropylene-based resin composition of the present invention may be incorporated with one or more other components so long as the effect of the present invention is not significantly damaged. The other components useful for the present invention include a pigment for coloration, antioxidant (e.g., phenol-, sulfur or phosphorus-based one), anti-static agent, light stabilizer (e.g., hindered amine), UV absorber, nucleating agent (e.g., organoaluminum, phosphoric acid ester), organic peroxide, acid anhydride, dispersant, neutralizing agent, foaming agent, copper damage inhibitor, lubricant, flame retardant, vinyl ester, carbon nano-tubes, fullerene, paint modifier and coupling agent. Carbon fibers for the present invention may be surface-treated with a common coupling agent, e.g., silane coupling agent or organic titanate, to enhance a synergistic effect with a polypropylene resin, which is hydrophobic. This embodiment is included in the scope of the present invention, although the object of the present invention can be achieved with untreated carbon fibers.

The polypropylene-based resin composition of the present invention may be incorporated with another resin which can reinforce properties of the polypropylene resin as the component (A) at around 1 to 20% by weight. These resins useful for the present invention include those working as the so-called high-molecular-weight plasticizer or processing aid, e.g., various high-molecular weight compound for blending purposes (ethylene-acetate vinyl copolymer), natural resin (mineral oil, terpene and coumarone resin) and natural and synthetic rubber (e.g., natural rubber, conjugated diene-based rubber, acrylonitrile-based rubber, chloroprene-based rubber and butyl rubber); and various high-molecular-weight compounds, e.g., those working for improving impact resistance.

2. Content of Each Component

The polypropylene-based resin composition of the present invention is composed of a polypropylene resin (A) and carbon fibers (C) as the essential components. It may be further incorporated optionally with an inorganic filler (B) when preference is given to rigidity or dimensional stability and/or ethylene- and/or styrene-based elastomer (D) for further improving impact resistance or the like, to produce the objective polypropylene-based resin composition. It is essential to incorporate each of these components at a content in the following range.

When the polypropylene-based resin composition of the present invention is composed of the components (A) to (C), the (A)/(B)/(C) ratio is 50% or more but below 99.5%/more than 0% but 30% or less/0.5 to 20%, all percentages by weight. More preferably, it is 60 to 94/5 to 30/1 to 10 by weight. Content of each component beyond the above range is not desirable. At a component (A) content below 50%, the resin composition may have insufficient fabricability. At above 99.5%, the resin composition may not have high dimensional stability, which is the objective of the present invention.

At a component (B) content of 0%, the resin composition may not have sufficient dimensional stability. At above 30%, light weight of polypropylene resin as one of its characteristics may not be fully utilized.

At a component (C) content below 1%, the resin composition may not have sufficient dimensional stability. At above 20%, the resin composition may have significantly deteriorated ductility.

When the polypropylene-based resin composition of the present invention is composed of the components (A) to (D), the (A)/(B)/(C)/(D) ratio is 10% or more but below 94.5%/ more than 0% but 30% or less/0.5 to 20%/5 to 50%, all percentages by weight. More preferably, it is 10 to 89/5 to 30/1 to 10/5 to 50 by weight. Content of each component beyond the above range is not desirable. At a component (A) content below 10%, the resin composition may have insufficient fabricability. At above 94.5%, the resin composition may not have sufficient dimensional stability. At a component (D) content below 5%, it may not sufficiently exhibit its effect of improving impact resistance. At above 50%, the resin composition may have deteriorated rigidity, heat resistance, fabricability and the like.

For the polypropylene-based resin composition of the present invention, which intends to dispense with an inorganic filler (B), there is no positive reason for incorporating an inorganic filler, as discussed below, because lightness (i.e., low density) is one of its essential features. The inorganic fillers described above include talc, mica and glass fibers.

An inorganic filler, when positively incorporated, leaves ashes when incinerated, posing an obstacle to recycling. Incorporation of various common organic fibers or additives which leave no incineration ashes, e.g., polyamide and polyester fibers, is also one embodiment of the present invention to improve its lightness and strength.

The polypropylene-based resin composition of the present invention, intending to substantially dispense with an inorganic filler as the component (B), can be produced by compositing the components (A), (C) and (D) in an (A)/(C)/(D) ratio of 30 to 95/5 to 50/0.5 to 20 by weight. A ratio beyond the above range is not desirable, because it will degrade various properties of the resin composition as a whole, as discussed later. Moreover, the polypropylene-based resin composition of the present invention has a density below 1.00 $g/cm^3$, determined in accordance with JIS K-7112, preferably below 0.95 $g/cm^3$.

3. Polypropylene-Based Resin Composition and Method for Production Thereof

In one embodiment of the present invention, carbon fibers as the component (C) are incorporated in the components (A) and (B) and the optional component (D) being molten and kneaded, after ratio of these components is adjusted at a level within the range described above, to produce the polypropylene-based resin composition. The melting/kneading method is preferably selected from those which can composite these components in such a way that the resulting resin composition pellets or carbon fibers present in the molded shape have an average length of 0.05 mm or more, preferably 0.3 mm or more. One of these melting/kneading methods uses a twin-screw extruder system which sufficiently treats the components (A) and (B) and component (D) as required, and supplies carbon fibers as the component (C) from the extruder side by a sidefeed and the like, to disperse the converged fibers in the mixture while controlling their breaking as far as possible.

The average fiber length beyond the above range is not desirable. When it is below 0.05 mm, the resin composition may be difficult to secure high dimensional stability on a level with that of metallic materials as the object of the present invention. When it is 20 mm or more, on the other hand, the resin composition may have significantly deteriorated fabricability and outer appearances.

The carbon fibers have an initial length of 0.1 to 20 mm, when they are incorporated in the other components being molten and kneaded, and average length of 0.05 mm or more but below 20 mm in the molten/kneaded composition, by which is meant that the fibers substantially keep their initial length without being broken excessively in the melting/kneading step. The present invention utilizes peculiar characteristics of polypropylene-based resin, e.g., rapidly reduced viscoelasticity at its softening or melting point, where carbon fibers are incorporated in the resin of rapidly reduced viscoelasticity in the melting/kneading step to control their damages, because of reduced shear stress.

Therefore, the present invention can be achieved by giving technical considerations to temperature of the extruder for producing the starting material to be molded (e.g., particles or pellets), kneading conditions (e.g., quantity of the composition to be extruded), screw rotating speed, and devices associated with incorporation of carbon fibers (e.g., hopper and mold periphery).

The average fiber length can be determined by optical microscopic analysis of the pellet and molded article cross-sections.

In another embodiment of the present invention, carbon fibers as the component (C) are incorporated in a polypropylene resin as the component (A) and elastomer as the component (D) being molten and kneaded, to produce the polypropylene-based resin composition, substantially free of an inorganic filler as the component (B). The melting/kneading method is preferably selected from those which can composite these components in such a way that the resulting resin composition pellets or molded shape having carbon fibers present in the molded shape have an average length of 0.3 mm or more. One of these melting/kneading methods uses a twin-screw extruder system which sufficiently treats the components (A) and (D), and supplies carbon fibers as the component (C) from the extruder side by a sidefeed and the like, to disperse the converged fibers in the mixture while controlling their breaking as far as possible.

The average fiber length beyond the above range is not desirable. When it is below 0.3 mm, various properties of the resulting pellets or molded article thereof may be degraded, as discussed later. When it is 20 mm or more, on the other hand, the resin composition may have significantly deteriorated outer appearances, when molded into a shape. The average fiber length can be determined by optical microscopic analysis of the pellet cross-sections. It can be adjusted by selecting an adequate carbon fiber feeding method, and controlling kneading conditions, e.g., screw rotating speed and quantity of the resin composition to be extruded, during the melting/kneading step in which the fibers are treated together with a block copolymer and elastomer.

It is preferable to consider residual carbon fiber length distribution, in order to realize the effect of the present invention in the form of high mechanical properties, e.g., dimensional stability of the product. More specifically, the polypropylene-based resin composition of the present invention can particularly suitably realize high mechanical properties of the polypropylene-based resin composition as the effect of the present invention, when the residual carbon fibers have a number-average fiber length of 0.3 mm or more, and, at the same time, a length distribution with the fibers of 0.5 mm or more in length accounting for at least 20% of the total number and those of 0.7 mm or more in length accounting for at least 5%. In order to control the residual fiber length distribution, it is essential to use each component of specified structure and species, and, at the same time, to fully consider production conditions for compositing the components by melting/kneading. One method which can produce the composition satisfying the above conditions uses a twin-screw extruder system to sufficiently melt/knead the components other than carbon fibers, and supplies carbon fibers by a device, e.g., side feeder, to control their breaking as far as possible during the melting/kneading step.

The polypropylene-based resin composition of the present invention, with the object to improve dimensional stability, is particularly suitably used as an industrial material for automobile parts or the like, when it has the following properties.

These properties are average fiber length (final fiber length, or residual fiber length) of the carbon fibers in the molten/ kneaded resin composition: 0.05 to 20 mm, MFR: 10 to 130 g/10 minutes, linear expansion coefficient: $0.1 \times 10^{-5}$ cm/cm° C. or more but less but below $3 \times 10^{-5}$ cm/cm° C. at 23 to 80° C., density: 0.91 to 1.20 g/cm$^3$, flexural modulus: 2000 MPa or more, and Izod impact strength with notched specimen: 200 J/m or more at 23° C. and 40 J/m or more at −30° C.

The polypropylene-based resin composition of the present invention substantially free of inorganic filler preferably has the following properties, after being pelletized or molded into a shape; average length of the carbon fibers present in the pelletized resin composition: 0.3 to 20 mm, density (determined in accordance with JIS K-7112): below 1.00 g/cm$^3$, MFR (determined in accordance with JIS K-7210 at 230° C. under a load of 21.16N): 10 to 130 g/10 minutes, flexural modulus (determined in accordance with JIS K-7171): 1400 to 6000 MPa, more preferably 1500 to 5000 MPa, Izod impact strength (determined in accordance with JIS K-7110): 400 J/m or more, more preferably 450 J/m or more at 23° C. and 50 J/m or more, more preferably 60 J/m or more at −30° C., tensile elongation (determined in accordance with JIS K-7113): 200% or more, and deflection temperature under load (determined in accordance with JIS K-7191 under a load of 0.45 MPa): 80° C. or higher.

4. Molded Article

The polypropylene-based resin composition of the present invention, described above, can be molded into various shapes by various molding methods, e.g., injection (including gas injection), injection compression (press injection), extrusion, blow, calendaring, inflation, uniaxial stretching and biaxial stretching for film, of which injection, compression and injection compression molding are particularly preferable.

The polypropylene-based resin composition of the present invention, which has the highly balanced properties in addition to high fabricability as an inherent property of polypropylene resin, can be molded into various important industrial parts, e.g., those for vehicles, home electric/electronic appliance housings and building materials by the molding methods described above. The present invention includes embodiments of these parts and products in which the polypropylene-based resin composition of the present invention is used.

EXAMPLES

The present invention is described in more detail by EXAMPLES, which by no means limit the present invention, and include various variations and modifications so long as they do not deviate scope of the present invention. The analytical procedures for determining various properties and materials used in EXAMPLES are first described.

1. Analytical Procedures (1) MFR (unit: g/10 minutes): determined in accordance with JIS K-7210, Condition 14, at 230° C. under a load of 21.18N
(2) Linear expansion coefficient (unit: cm/cm° C.): determined in accordance with ASTM D696 at 23 to 80° C.
(3) Flexural modulus (unit: MPa): determined in accordance with JIS K-7171 at 23° C.
(4) Izod impact strength (unit: J/m): determined in accordance with JIS K-7110 at 23 and −30° C.
(5) Deflection temperature under load (unit: ° C.): determined in accordance with JIS K-7191-2 under a load of 0.45 MPa.
(6) Tensile breaking elongation (unit: %): determined in accordance with JIS K-7113, with the No. 1 shape specimen tested at a tensile speed of 10 mm/minute.
(7) Density (unit: g/cm$^3$): determined in accordance with JIS K-7112 (Archimedean method)
(8) Average length of carbon fibers in the pelletized resin composition (unit: mm): The strand-cut pellet is cut in the direction perpendicular to the strand-cut plane, and the cut plane is observed by a reflection optical microscope (Intel Play, MODEL. APB-24221-99A, magnification: 60), and the observed lengths are averaged.

2. Materials Used (A) Polypropylene resin

The polypropylene resins prepared in PRODUCTION EXAMPLES 1 to 7 (PP-1 to PP-7) were used. Their characteristics are given in Table 1.

Production Example 1

(i) Production of the Polymerization Catalyst Component (1)

A 10 L flask, sufficiently purged with nitrogen, was charged with 4000 mL of n-heptane treated to remove moisture and oxygen, and then with 8 mols of MgCl$_2$ and 16 mols of Ti(O-n-C$_4$H$_9$)$_4$, and the reaction was allowed to proceed at 95° C. for 2 hours. On completion of the reaction, the mixture was cooled to 40° C. and then reacted with 960 mL of methyl hydropolysiloxane (viscosity: 20 Cst) added to the flask for 3 hours. The resulting solid component was washed with n-heptane. Next, a 10 L flask, sufficiently purged with nitrogen, was charged with 1000 mL of similarly refined n-heptane and 4.8 mols (as Mg) of the solid component synthesized above. Then, a mixture of 500 mL of n-heptane and 8 mols of SiCl$_4$ was added to the flask at 30° C. in 30 minutes, and the reaction was allowed to proceed at 70° C. for 3 hours. On completion of the reaction, the resulting solid component was washed with n-heptane. Next, a mixture of 500 mL of n-heptane and 0.48 mols of phthalic acid chloride was added to the flask at 70° C. in 30 minutes, and the reaction was allowed to proceed at 90° C. for 1 hour. On completion of the reaction, the resulting solid component was washed with n-heptane. Then, 200 mL of SiCl$_4$ was added to the flask, and the reaction was allowed to proceed at 80° C. for 6 hours. On completion of the reaction, the product was sufficiently washed with n-heptane to prepare the solid component. The titanium content measured with a portion of solid component was at 1.3% by weight.

Next, a 10 L flask, sufficiently purged with nitrogen, was charged with 1000 mL of similarly refined n-heptane and 100 g of the solid component synthesized above, with which 24 mL of (t-C$_4$H$_9$)Si(CH$_3$)(OCH$_3$)$_2$ and 34 g of Al(C$_2$H$_5$)$_3$ were brought into contact at 30° C. for 2 hours. Then, the resulting solid component was washed with n-heptane, to prepare the polymerization catalyst component (1) mainly composed of magnesium chloride. The titanium content measured with a portion of solid component was at 1.1% by weight.

(ii) Production of Propylene Resin

Propylene was polymerized continuously in a vapor-phase reactor having an effective reaction zone volume of 280 L at 85° C. and a propylene partial pressure of 22 kg/cm$^2$ in the presence of the polymerization catalyst (1) prepared above and triethyl aluminum, continuously supplied at 1.8 and 5.5 g/hour, respectively. The resulting polypropylene homopolymer (PP-1) was continuously discharged from the reactor after propylene was polymerized to a given extent. It had a [mmmm] value of 0.987 and MFR of 40 g/10 minutes.

Production Example 2

Propylene was polymerized continuously in a gas-phase, fluidized-bed reactor having an effective reaction zone volume of 280 L at 85° C. and a propylene partial pressure of 22 kg/cm$^2$ in the presence of the polymerization catalyst (1) prepared in PRODUCTION EXAMPLE 1 and triethylaluminum, continuously supplied at 1.8 and 5.5 g/hour, respectively (first polymerization stage). The resulting powdery propylene homopolymer was continuously supplied at 25 kg/hour to another gas-phase, fluidized-bed reactor having an effective reaction zone volume of 280 L for continuous copolymerization of propylene and ethylene (second polymerization stage). The resulting polymer was continuously discharged from the second polymerization stage reactor at 27 kg/hour to produce the propylene/ethylene block copolymer (PP-2). Hydrogen concentration was controlled at an H$_2$/propylene molar ratio of 0.045 in the first stage and H$_2$/(ethylene+propylene) molar ratio of 0.01 in the second stage to control polymer molecular weight. The propylene/ethylene gas composition was controlled at a propylene/ethylene molar ratio of 1/1 in the second polymerization stage to control the ethylene content of the rubber-like copolymer. The propylene homopolymer discharged from the first stage reactor had a [mmmm] value of 0.986 and MFR of 142 g/10 minutes, and the propylene/ethylene block copolymer discharged from the second stage reactor had an MFR of 65 g/10 minutes.

Production Example 3

The propylene/ethylene block copolymer (PP-3) was prepared in the same manner as in PRODUCTION EXAMPLE 2, except that H$_2$/propylene molar ratio was controlled at 0.048 in the first stage and 0.015 in the second stage.

The propylene homopolymer discharged from the first stage reactor had an [mmmm] value of 0.986 and MFR of 213 g/10 minutes, and the propylene/ethylene block copolymer discharged from the second stage reactor had an MFR of 10 g/10 minutes.

Production Example 4

(i) Production of the Polymerization Catalyst Component (2)

A flask, sufficiently purged with nitrogen, was charged with 200 mL of n-heptane treated to remove moisture and oxygen, and then with 0.4 mols of MgCl$_2$ and 0.8 mols of Ti(O-n-C$_4$H$_9$)$_4$, and the reaction was allowed to proceed at 95° C. for 2 hours. On completion of the reaction, the resulting solid component was cooled to 40° C. and then reacted with 48 mL of methylhydropolysiloxane (viscosity: 20 Cst) added to the flask for 3 hours. The resulting solid component was washed with n-heptane.

Next, a flask, sufficiently purged with nitrogen, was charged with 50 mL of similarly refined n-heptane and 0.06 mols (as Mg) of the solid component synthesized above. Then, a mixture of 25 mL of n-heptane and 0.2 mols of SiCl$_4$ was added to the flask at 30° C. in 30 minutes, and the reaction was allowed to proceed at 90° C. for 4 hours. On completion of the reaction, the product was washed with n-heptane to prepare the solid component mainly composed of magnesium chloride. The titanium content measured with a portion of solid component was at 3.5% by weight.

Next, a flask, sufficiently purged with nitrogen, was charged with 50 mL of similarly refined n-heptane and 5 g of the solid component synthesized above, with which 0.2 mols of SiCl$_4$, 2.8 mL of (t-C$_4$H$_9$)Si(CH$_3$)(OCH$_3$)$_2$ and 9.0 g of Al(C$_2$H$_5$)$_3$ were brought into contact at 30° C. for 2 hours. Then, the product was washed with n-heptane, to prepare the polymerization catalyst component (2) mainly composed of magnesium chloride. The titanium content measured with a portion of solid component was at 3.0% by weight.

(ii) Production of Propylene Resin

The propylene/ethylene block copolymer (PP-4) was prepared in a manner similar to that for PRODUCTION EXAMPLE 2 in the presence of the polymerization catalyst component (2), prepared in (ii) above, and triethylaluminum.

The propylene homopolymer discharged from the first stage reactor had an [mmmm] value (representing isotactic pentad fraction) of 0.972 and MFR of 138 g/10 minutes, and the propylene/ethylene block copolymer withdrawn from the second stage reactor had an MFR of 66 g/10 minutes.

Production Example 5

Propylene was polymerized continuously in a gas-phase, fluidized-bed reactor having an effective reaction zone volume of 280 L at 85° C. and a propylene partial pressure of 22 kg/cm$^2$ in the presence of the polymerization catalyst (1) prepared in PRODUCTION EXAMPLE 1 and triethylaluminum, continuously supplied at 1.8 and 5.5 g/hour, respectively (first polymerization stage). The resulting powdery propylene homopolymer was continuously fed at 25 kg/hour to another vapor-phase, fluidized-bed reactor having an effective reaction zone volume of 280 L for continuous copolymerization of propylene and ethylene (second polymerization stage). The resulting polymer was continuously discharged from the second polymerization stage reactor at 27 kg/hour to produce the propylene/ethylene block copolymer (PP-5). Hydrogen concentration was controlled at an H$_2$/propylene molar ratio of 0.058 in the first stage and H$_2$/(ethylene+propylene) molar ratio of 0.01 in the second stage to control polymer molecular weight. The propylene/ethylene gas composition was controlled at a propylene/ethylene molar ratio of 55/45 in the second polymerization stage to control the ethylene content of the rubber-like copolymer. The propylene homopolymer discharged from the first stage reactor had an a [mmmm] value (representing isotactic pentad fraction) of 0.985 and MFR of 210 g/10 minutes, and the propylene/ethylene block copolymer discharged from the second stage reactor had an MFR of 110 g/10 minutes.

Production Example 6

The propylene/ethylene block copolymer (PP-6) was prepared in the same manner as in PRODUCTION EXAMPLE 5, except that H$_2$/propylene molar ratio was controlled at 0.045 in the first stage and 0.008 in the second stage.

Production Example 7

The propylene/ethylene block copolymer (PP-7) was prepared in the same manner as in PRODUCTION EXAMPLE 5, except that the solid catalyst component (2) prepared in PRODUCTION EXAMPLE 4 was used.

TABLE 1

| Name | Type Classification | Homopolymer portion Isotactic pentad fraction % | Copolymer portion Propylene content wt % | Copolymer portion Weight-average molecular weight g/mol | Copolymer portion Extent of copolymerization wt % | Glass transition temperature °C | Propylene resin MFR g/10 min |
|---|---|---|---|---|---|---|---|
| PP-1 | Homopolymer | 98.7 | — | — | — | — | 40 |
| PP-2 | Block copolymer | 98.6 | 49 | 1210000 | 8 | −45.2 | 65 |
| PP-3 | Block copolymer | 98.6 | 62 | 1050000 | 8 | −42.8 | 100 |
| PP-4 | Block copolymer | 97.2 | 49 | 1200000 | 8 | −45.8 | 66 |
| PP-5 | Block copolymer | 98.5 | 61 | 1080000 | 8 | −43.2 | 110 |
| PP-6 | Block copolymer | 98.2 | 51 | 1210000 | 8 | −45.2 | 65 |
| PP-7 | Block copolymer | 97.1 | 60 | 1050000 | 8 | −42.8 | 105 |

(B) Inorganic Filler

Talc-1 to Talc-4, given in Table 2, were used.

TABLE 2

| Name | Trade name | Maker | Average particle size μm |
|---|---|---|---|
| Talc-1 | Micron White 5000A | Hayashi Kasei | 7.8 |
| Talc-2 | LMS-200 | Fuji Talc | 5.6 |
| Talc-3 | Hi filler #7 | Matsumura Sangyo | 11 |
| Talc-4 | LMS #300 | Fuji Talc | 2.1 |

(C) Carbon Fibers

Chopped carbon fibers CF-1 to CF-4, given in Table 3, were used. In addition, Whiskers-1 and Whisker-2 were also used as the comparative carbon fibers.

TABLE 3

| Name | Trade name | Type | Maker | Fiber diameter μm | Fiber length mm |
|---|---|---|---|---|---|
| CF-1 | TW12 | PAN-based carbon fibers | Toray | 7 | 6 |
| CF-2 | K223SE | Pitch-based carbon fibers | Mitsubishi Chemical Functional Products | 10 | 6 |
| CF-3 | S234 | Pitch-based carbon fibers | Osaka Gas Chemicals | 18 | 10 |
| CF-4 | M-207S | Pitch-based carbon fibers | Kureha | 14.5 | 0.4 |
| Whisker-1 | Mos Hige | Magnesium sulfate whiskers | Ube Materials | 0.8 | 0.02 |
| Whisker-2 | TISMO-D | Potassium titanate whiskers | Otsuka Chemical | 0.5 | 0.015 |

(D) Elastomer

Rubber-1 to rubber-3, given in Table 4, were used.

TABLE 4

| Name | Trade name | Type Maker | Type | Density g/cc | MFR g/10 min | Comonomer content wt % | Styrene content wt % |
|---|---|---|---|---|---|---|---|
| Rubber-1 | EG8180 | Du Pont/Dow Elastomer | Ethylene/octene copolymer | 0.864 | 1.4 | 25 | — |
| Rubber-2 | A1050 | Mitsui Chemicals | Ethylene/butene copolymer | 0.862 | 1.0 | 33 | — |
| Rubber-3 | G1657 | Shell | SEBS | 0.9 | 9 | — | 13 |

Examples 1 to 16

Each of the compositions given in Table 5 was incorporated with 0.1 parts of a phenol-based antioxidant (Ciba Specialty Chemicals, IRGANOX 1010), 0.05 parts of a phosphorus-based antioxidant (Ciba Specialty Chemicals, IRGAFOS 168) and 0.3 parts of calcium stearate, all parts by weight, was charged in a base hopper for a co-rotating twin-screw extruder (Japan Steel Works, TEX30α), and carbon fibers were charged by a side feeder 3 barrels before the extruder rear end to the concentration given, to carry out the melting/kneading step at a screw rotating speed of 300 rpm and extrusion rate of 15 kg/hour. Each of the resulting pelletized polypropylene resin compositions was molded by an injection molder (Toshiba Machines, IS170, clamping force: 170 tons) at mold temperature of 40° C. and cylinder temperature of 220° C., to prepare the samples. These samples were put in a constant-temperature chamber kept at 23° C. for 7 days for adjusting their conditions for analysis.

These samples were analyzed by the procedures described earlier for various properties. The evaluation results are given in Table 6.

TABLE 5

| | (A) Propylene resin | | (B) Inorganic filler | | (C) Carbon fibers | | (D) Elastomer | | | | | |
|---|---|---|---|---|---|---|---|---|---|---|---|---|
| Sample name | Type — | Content wt % | Type — | Content wt % | Type — | Content wt % | Type 1 — | Content wt % | Type 2 — | Content wt % | Type 3 — | Content wt % |
| EXAMPLE 1 | PP-1 | 76 | Talc-1 | 20 | CF-1 | 4 | — | 0 | — | 0 | — | 0 |
| EXAMPLE 2 | PP-1 | 72 | Talc-1 | 20 | CF-1 | 8 | — | 0 | — | 0 | — | 0 |
| EXAMPLE 3 | PP-2 | 47.5 | Talc-1 | 20 | CF-1 | 4 | Rubber-1 | 28.5 | — | 0 | — | 0 |
| EXAMPLE 4 | PP-2 | 45 | Talc-1 | 20 | CF-1 | 8 | Rubber-1 | 27 | — | 0 | — | 0 |
| EXAMPLE 5 | PP-3 | 47.5 | Talc-1 | 20 | CF-1 | 4 | Rubber-1 | 28.5 | — | 0 | — | 0 |
| EXAMPLE 6 | PP-3 | 45 | Talc-1 | 20 | CF-1 | 8 | Rubber-1 | 27 | — | 0 | — | 0 |
| EXAMPLE 7 | PP-3 | 47.5 | Talc-1 | 20 | CF-1 | 4 | Rubber-1 | 19 | Rubber-2 | 9.5 | — | 0 |
| EXAMPLE 8 | PP-3 | 45 | Talc-1 | 20 | CF-1 | 8 | Rubber-1 | 18 | Rubber-2 | 9 | — | 0 |
| EXAMPLE 9 | PP-3 | 47.5 | Talc-1 | 20 | CF-1 | 4 | Rubber-1 | 14.25 | Rubber-2 | 9.5 | Rubber-3 | 4.75 |
| EXAMPLE 10 | PP-3 | 45 | Talc-1 | 20 | CF-1 | 8 | Rubber-1 | 13.5 | Rubber-2 | 9 | Rubber-3 | 4.5 |
| EXAMPLE 11 | PP-3 | 47.5 | Talc-2 | 20 | CF-1 | 4 | Rubber-1 | 28.5 | — | 0 | — | 0 |
| EXAMPLE 12 | PP-3 | 45 | Talc-2 | 20 | CF-1 | 8 | Rubber-1 | 27 | — | 0 | — | 0 |
| EXAMPLE 13 | PP-3 | 47.5 | Talc-1 | 20 | CF-2 | 4 | Rubber-1 | 28.5 | — | 0 | — | 0 |
| EXAMPLE 14 | PP-3 | 45 | Talc-1 | 20 | CF-2 | 8 | Rubber-1 | 27 | — | 0 | — | 0 |
| EXAMPLE 15 | PP-3 | 47.5 | Talc-2 | 20 | CF-2 | 4 | Rubber-1 | 28.5 | — | 0 | — | 0 |
| EXAMPLE 16 | PP-3 | 45 | Talc-2 | 20 | CF-2 | 8 | Rubber-1 | 27 | — | 0 | — | 0 |

TABLE 6

| Sample name | Average length of fibers in the pellets mm | MFR g/10 min | Density g/cc | Linear expansion coefficient 23~80° C. ×10$^{-6}$/° C. | Flexural modulus MPa | Izod impact strength 23° C. J/m | Izod impact strength −30° C. J/m | Tensile elongation % | Deflection temperature under load 0.45 MPa ° C. |
|---|---|---|---|---|---|---|---|---|---|
| EXAMPLE 1 | 0.07 | 34 | 1.06 | 2.1 | 4430 | 32 | 28 | 150 | 151 |
| EXAMPLE 2 | 0.06 | 29 | 1.09 | 1.0 | 5960 | 30 | 28 | 100 | 153 |
| EXAMPLE 3 | 0.08 | 12 | 1.05 | 1.1 | 2810 | 320 | 73 | >300 | 136 |
| EXAMPLE 4 | 0.07 | 9 | 1.08 | 0.5 | 4220 | 150 | 55 | 50 | 142 |
| EXAMPLE 5 | 0.09 | 19 | 1.05 | 0.9 | 2820 | 280 | 57 | 230 | 140 |
| EXAMPLE 6 | 0.08 | 13 | 1.08 | 0.4 | 4320 | 120 | 51 | 30 | 146 |
| EXAMPLE 7 | 0.09 | 17 | 1.05 | 0.9 | 2920 | 250 | 63 | 70 | 141 |
| EXAMPLE 8 | 0.08 | 13 | 1.08 | 0.3 | 4290 | 140 | 60 | 30 | 147 |

TABLE 6-continued

| Sample name | Average length of fibers in the pellets mm | MFR g/10 min | Density g/cc | Linear expansion coefficient 23~80° C. ×10$^{-6}$/° C. | Flexural modulus MPa | Izod impact strength 23° C. J/m | Izod impact strength −30° C. J/m | Tensile elongation % | Deflection temperature under load 0.45 MPa ° C. |
|---|---|---|---|---|---|---|---|---|---|
| EXAMPLE 9 | 0.08 | 16 | 1.05 | 1.0 | 2730 | 320 | 62 | >300 | 120 |
| EXAMPLE 10 | 0.08 | 11 | 1.08 | 0.4 | 4120 | 200 | 61 | >300 | 126 |
| EXAMPLE 11 | 0.08 | 18 | 1.05 | 0.8 | 2980 | 240 | 55 | 250 | 143 |
| EXAMPLE 12 | 0.08 | 12 | 1.08 | 0.3 | 4460 | 110 | 45 | 50 | 148 |
| EXAMPLE 13 | 0.09 | 23 | 1.05 | 1.1 | 2650 | 350 | 60 | 200 | 136 |
| EXAMPLE 14 | 0.08 | 17 | 1.08 | 0.6 | 4130 | 180 | 54 | 70 | 142 |
| EXAMPLE 15 | 0.08 | 22 | 1.05 | 1.0 | 2830 | 260 | 60 | 250 | 138 |
| EXAMPLE 16 | 0.08 | 16 | 1.08 | 0.5 | 4270 | 160 | 52 | 100 | 145 |

Comparative Examples 1 to 16

The compositions given in Table 7 were molten/kneaded and injection-molded in a manner similar those for EXAMPLES, and the resulting samples were analyzed also similarly for various properties. The evaluation results are given in Table 8.

TABLE 7

| Sample name | (A) Propylene resin Type | (A) Content wt % | (B) Inorganic filler Type | (B) Content wt % | (C) CF or whiskers Type | (C) Content wt % | (D) Elastomer Type 1 | (D) Content wt % | (D) Type 2 | (D) Content wt % | (D) Type 3 | (D) Content wt % |
|---|---|---|---|---|---|---|---|---|---|---|---|---|
| COMPARATIVE EXAMPLE 1 | PP-4 | 47.5 | Talc-1 | 20 | CF-1 | 4 | Rubber-1 | 28.5 | — | 0 | — | 0 |
| COMPARATIVE EXAMPLE 2 | PP-4 | 45 | Talc-1 | 20 | CF-1 | 8 | Rubber-1 | 27 | — | 0 | — | 0 |
| COMPARATIVE EXAMPLE 3 | PP-2 | 47.5 | Talc-3 | 20 | CF-1 | 4 | Rubber-1 | 28.5 | — | 0 | — | 0 |
| COMPARATIVE EXAMPLE 4 | PP-2 | 47.5 | Talc-1 | 20 | CF-3 | 4 | Rubber-1 | 28.5 | — | 0 | — | 0 |
| COMPARATIVE EXAMPLE 5 | PP-2 | 47.5 | Talc-1 | 20 | Whisker-1 | 4 | Rubber-1 | 28.5 | — | 0 | — | 0 |
| COMPARATIVE EXAMPLE 6 | PP-2 | 45 | Talc-1 | 20 | Whisker-1 | 8 | Rubber-1 | 27 | — | 0 | — | 0 |
| COMPARATIVE EXAMPLE 7 | PP-2 | 42.5 | Talc-1 | 20 | Whisker-1 | 12 | Rubber-1 | 25.5 | — | 0 | — | 0 |
| COMPARATIVE EXAMPLE 8 | PP-2 | 47.5 | Talc-1 | 20 | Whisker-2 | 4 | Rubber-1 | 28.5 | — | 0 | — | 0 |
| COMPARATIVE EXAMPLE 9 | PP-2 | 45 | Talc-1 | 20 | Whisker-2 | 8 | Rubber-1 | 27 | — | 0 | — | 0 |
| COMPARATIVE EXAMPLE 10 | PP-2 | 42.5 | Talc-1 | 20 | Whisker-2 | 12 | Rubber-1 | 25.5 | — | 0 | — | 0 |
| COMPARATIVE EXAMPLE 11 | PP-2 | 37.7 | Talc-1 | 30 | Whisker-2 | 4 | Rubber-1 | 28.3 | — | 0 | — | 0 |
| COMPARATIVE EXAMPLE 12 | PP-2 | 35.4 | Talc-1 | 30 | Whisker-2 | 8 | Rubber-1 | 26.6 | — | 0 | — | 0 |
| COMPARATIVE EXAMPLE 13 | PP-2 | 33.1 | Talc-1 | 30 | Whisker-2 | 12 | Rubber-1 | 24.9 | — | 0 | — | 0 |
| COMPARATIVE EXAMPLE 14 | PP-1 | 80 | Talc-1 | 20 | — | 0 | — | 0 | — | 0 | — | 0 |
| COMPARATIVE EXAMPLE 15 | PP-3 | 50 | Talc-1 | 20 | — | 0 | Rubber-1 | 30 | — | 0 | — | 0 |
| COMPARATIVE EXAMPLE 16 | PP-3 | 50 | Talc-1 | 20 | — | 0 | Rubber-1 | 20 | Rubber-2 | 10 | — | 0 |

TABLE 8

| Sample name | Average length of fibers in the pellets mm | MFR g/10 min | Density g/cc | Linear expansion coefficient 23~80° C. ×10⁻⁵/° C. | Flexural modulus MPa | Izod impact strength 23° C. J/m | Izod impact strength −30° C. J/m | Tensile elongation % | Deflection temperature under load 0.45 MPa ° C. |
|---|---|---|---|---|---|---|---|---|---|
| COMPARATIVE EXAMPLE 1 | 0.08 | 12 | 1.05 | 4.3 | 1950 | 330 | 75 | >300 | 127 |
| COMPARATIVE EXAMPLE 2 | 0.08 | 9 | 1.08 | 3.4 | 3200 | 160 | 58 | 50 | 134 |
| COMPARATIVE EXAMPLE 3 | 0.09 | 13 | 1.05 | 3.4 | 2430 | 300 | 68 | 260 | 133 |
| COMPARATIVE EXAMPLE 4 | 0.08 | 12 | 1.05 | 6.1 | 2120 | 320 | 71 | 200 | 129 |
| COMPARATIVE EXAMPLE 5 | 0.004 | 25 | 1.05 | 5.6 | 2100 | 500 | 56 | 150 | 127 |
| COMPARATIVE EXAMPLE 6 | 0.003 | 22 | 1.08 | 5.2 | 2770 | 380 | 43 | 100 | 134 |
| COMPARATIVE EXAMPLE 7 | 0.003 | 18 | 1.12 | 3.9 | 3240 | 290 | 26 | 50 | 138 |
| COMPARATIVE EXAMPLE 8 | 0.002 | 20 | 1.06 | 5.1 | 2260 | 320 | 49 | 120 | 129 |
| COMPARATIVE EXAMPLE 9 | 0.002 | 15 | 1.10 | 4.6 | 2940 | 220 | 41 | 90 | 136 |
| COMPARATIVE EXAMPLE 10 | 0.002 | 10 | 1.14 | 3.4 | 3410 | 140 | 36 | 40 | 138 |
| COMPARATIVE EXAMPLE 11 | 0.002 | 21 | 1.15 | 4.0 | 2930 | 240 | 41 | 70 | 131 |
| COMPARATIVE EXAMPLE 12 | 0.002 | 14 | 1.2 | 3.6 | 3610 | 130 | 36 | 30 | 138 |
| COMPARATIVE EXAMPLE 13 | 0.002 | 9 | 1.25 | 3.0 | 4020 | 90 | 25 | 10 | 139 |
| COMPARATIVE EXAMPLE 14 | — | 40 | 1.04 | 8.1 | 3190 | 35 | 30 | 200 | 141 |
| COMPARATIVE EXAMPLE 15 | — | 26 | 1.03 | 7.3 | 1620 | 790 | 150 | >300 | 110 |
| COMPARATIVE EXAMPLE 16 | — | 25 | 1.03 | 7.2 | 1630 | 680 | 160 | >300 | 112 |

As shown in Tables 5 to 8, the polypropylene-based resin composition of the present invention, prepared in each of EXAMPLES 1 to 16, has well-balanced properties of linear expansion coefficient, flexural modulus, load impact strength, tensile elongation and deflection temperature under load. On the other hand, the polypropylene-based resin composition, which comprised a propylene block copolymer whose propylene homopolymer portion has an isotactic pentad fraction below 98% (prepared in each of COMPARATIVE EXAMPLES 1 and 2), is inferior to the present invention in linear expansion coefficient, rigidity and heat resistance. The polypropylene-based resin composition incorporated with talc having an average particle size above 10 μm (prepared in COMPARATIVE EXAMPLE 3) is inferior in linear expansion coefficient, rigidity and heat resistance. The one incorporated with whiskers, finer and shorter than the carbon fibers for the present invention (prepared in each of COMPARATIVE EXAMPLES 5 to 13), has less balanced properties of linear expansion coefficient and impact resistance. The one free of carbon fibers (prepared in each of COMPARATIVE EXAMPLES 14 to 16) is inferior in linear expansion coefficient, rigidity and heat resistance.

Examples 17 to 28

Each of the compositions given in Table 9, comprising the components (A) to (C), was prepared by a twin-screw extruder (Japan Steel Works, TEX30αII) under the kneading conditions also given in Table 9. The samples were tested and evaluated in the same manner as in EXAMPLE 1. The evaluation results are given in Table 10.

TABLE 9

| | (A) Propylene/ethylene block copolymer | | (D) Elastomer | | (C) Carbon fibers | | Kneading conditions | | | |
|---|---|---|---|---|---|---|---|---|---|---|
| Sample name | Type | Content wt % | Type | Content wt % | Type | Content wt % | Extrusion rate kg/h | Method for charging carbon fibers | Screw rotating speed rpm | Cylinder set temperature ° C. |
| EXAMPLE 17 | PP-5 | 67.9 | EG8180 | 29.1 | TW12 | 3 | 15 | Side feed at the extruder end | 300 | 200 |

TABLE 9-continued

| | (A) Propylene/ethylene block copolymer | | (D) Elastomer | | (C) Carbon fibers | | Kneading conditions | | | |
|---|---|---|---|---|---|---|---|---|---|---|
| Sample name | Type — | Content wt % | Type — | Content wt % | Type — | Content wt % | Extrusion rate kg/h | Method for charging carbon fibers — | Screw rotating speed rpm | Cylinder set temperature ° C. |
| EXAMPLE 18 | PP-5 | 67.2 | EG8180 | 28.8 | TW12 | 4 | 15 | Side feed at the extruder end | 300 | 200 |
| EXAMPLE 19 | PP-5 | 66.5 | EG8180 | 28.5 | TW12 | 5 | 15 | Side feed at the extruder end | 300 | 200 |
| EXAMPLE 20 | PP-6 | 67.2 | EG8180 | 28.8 | TW12 | 4 | 15 | Side feed at the extruder end | 300 | 200 |
| EXAMPLE 21 | PP-6 | 67.2 | A1050 | 28.8 | TW12 | 4 | 15 | Side feed at the extruder end | 300 | 200 |
| EXAMPLE 22 | PP-6 | 67.2 | G1657 | 28.8 | TW12 | 4 | 15 | Side feed at the extruder end | 300 | 200 |
| EXAMPLE 23 | PP-6 | 67.2 | EG8180 | 28.8 | K223SE | 4 | 15 | Side feed at the extruder end | 300 | 200 |
| EXAMPLE 24 | PP-6 | 66.5 | EG8180 | 28.5 | K223SE | 5 | 15 | Side feed at the extruder end | 300 | 200 |
| EXAMPLE 25 | PP-6 | 66.5 | EG8180 | 28.5 | TW12 | 5 | 15 | Side feed at the extruder end | 300 | 200 |
| EXAMPLE 26 | PP-6 | 72 | G1657 | 24 | TW12 | 4 | 15 | Side feed at the extruder end | 300 | 200 |
| EXAMPLE 27 | PP-5 | 66.5 | EG8180 | 28.5 | TW12 | 5 | 15 | Charging together with other components to a base hopper | 300 | 200 |
| EXAMPLE 28 | PP-6 | 66.5 | EG8180 | 28.5 | TW12 | 5 | 15 | Charging together with other components to a base hopper | 300 | 200 |

TABLE 10

| | Average length of fibers in the pellets mm | MFR g/10 min | Density g/cc | Flexural modulus MPa | Izod impact strength 23° C. J/m | Izod impact strength −30° C. J/m | Tensile elongation — % | Deflection temperature under load 0.45 MPa ° C. |
|---|---|---|---|---|---|---|---|---|
| Sample name | | | | | | | | |
| EXAMPLE 17 | 2.0 | 24.7 | 0.904 | 1710 | 526 | 71 | 432 | 88 |
| EXAMPLE 18 | 2.1 | 23.6 | 0.908 | 2010 | 495 | 68 | 465 | 90 |
| EXAMPLE 19 | 1.8 | 22.9 | 0.913 | 2290 | 421 | 64 | 453 | 91 |
| EXAMPLE 20 | 1.9 | 16.6 | 0.908 | 1960 | 531 | 73 | 588 | 90 |
| EXAMPLE 21 | 1.8 | 15.1 | 0.907 | 1990 | 450 | 79 | 510 | 90 |
| EXAMPLE 22 | 1.8 | 16.2 | 0.918 | 1890 | 611 | 72 | 592 | 89 |
| EXAMPLE 23 | 2.0 | 17.6 | 0.909 | 1630 | 535 | 73 | 580 | 86 |
| EXAMPLE 24 | 1.9 | 16.5 | 0.914 | 1850 | 473 | 65 | 572 | 88 |
| EXAMPLE 25 | 1.8 | 15.9 | 0.913 | 2230 | 465 | 67 | 591 | 90 |
| EXAMPLE 26 | 1.8 | 20.0 | 0.918 | 2390 | 519 | 58 | 495 | 101 |
| EXAMPLE 27 | 0.5 | 24.3 | 0.913 | 1450 | 510 | 68 | 498 | 83 |
| EXAMPLE 28 | 0.3 | 19.6 | 0.911 | 1440 | 577 | 88 | 538 | 79 |

Comparative Examples 17 to 25

Each of the compositions given in Table 11, comprising the components (A) to (C), was prepared by a twin-screw extruder (Japan Steel Works, TEX30αII) in a manner similar to those for EXAMPLES 17 to 28. The evaluation results are given in Table 12.

weight of various parts while improving their rigidity and/or dimensional stability.

Moreover, the polypropylene-based resin composition of the present invention is well-balanced in thermal recyclability and properties, even essentially in the absence of inorganic filler, which produces incineration ashes, and well-balanced

TABLE 11

| | (A) Propylene/ethylene block copolymer | | (D) Elastomer | | (C) Carbon fibers, or (B) Inorganic filler | | Extrusion rate | Kneading conditions | | |
|---|---|---|---|---|---|---|---|---|---|---|
| Sample name | Type | Content wt % | Type | Content wt % | Type | Content wt % | kg/h | Method for charging carbon fibers | Screw rotating speed rpm | Cylinder set temperature °C. |
| COMPARATIVE EXAMPLE 17 | PP-5 | 70 | EG8180 | 30 | None | 0 | 15 | Carbon fibers not charged | 300 | 200 |
| COMPARATIVE EXAMPLE 18 | PP-6 | 70 | EG8180 | 30 | None | 0 | 15 | Carbon fibers not charged | 300 | 200 |
| COMPARATIVE EXAMPLE 19 | PP-7 | 67.9 | EG8180 | 29.1 | TW12 | 3 | 15 | Side feed at the extruder end | 300 | 200 |
| COMPARATIVE EXAMPLE 20 | PP-7 | 72 | G1657 | 24 | TW12 | 4 | 15 | Side feed at the extruder end | 300 | 200 |
| COMPARATIVE EXAMPLE 21 | PP-6 | 67.9 | G1657 | 29.1 | M-207S | 3 | 15 | Side feed at the extruder end | 300 | 200 |
| COMPARATIVE EXAMPLE 22 | PP-6 | 66.5 | G1657 | 28.5 | M-207S | 5 | 15 | Side feed at the extruder end | 300 | 200 |
| COMPARATIVE EXAMPLE 23 | PP-6 | 95 | None | 0 | TW12 | 5 | 15 | Side feed at the extruder end | 300 | 200 |
| COMPARATIVE EXAMPLE 24 | PP-6 | 63 | EG8180 | 27 | LMS#300 | 10 | 15 | Side feed at the extruder end | 300 | 200 |
| COMPARATIVE EXAMPLE 25 | PP-6 | 56 | EG8180 | 24 | LMS#300 | 20 | 15 | Side feed at the extruder end | 300 | 200 |

TABLE 12

| Sample name | Average length of fibers in the pellets mm | MFR g/10 min | Density g/cc | Flexural modulus MPa | Izod impact strength 23° C. J/m | Izod impact strength −30° C. J/m | Tensile elongation % | Deflection temperature under load 0.45 MPa °C. |
|---|---|---|---|---|---|---|---|---|
| COMPARATIVE EXAMPLE 17 | None | 27.1 | 0.890 | 890 | 691 | 103 | 505 | 86 |
| COMPARATIVE EXAMPLE 18 | None | 23.9 | 0.890 | 890 | 725 | 115 | 522 | 86 |
| COMPARATIVE EXAMPLE 19 | 2.0 | 25.1 | 0.904 | 1360 | 521 | 69 | 410 | 78 |
| COMPARATIVE EXAMPLE 20 | 2.1 | 23.5 | 0.918 | 1390 | 618 | 71 | 582 | 76 |
| COMPARATIVE EXAMPLE 21 | 0.1 | 17.9 | 0.913 | 1090 | 585 | 70 | 589 | 73 |
| COMPARATIVE EXAMPLE 22 | 0.1 | 16.1 | 0.923 | 1280 | 450 | 65 | 600 | 77 |
| COMPARATIVE EXAMPLE 23 | 2.1 | 56.3 | 0.923 | 3900 | 50 | 28 | 10 | 126 |
| COMPARATIVE EXAMPLE 24 | — | 20.1 | 0.953 | 1220 | 777 | 94 | 480 | 110 |
| COMPARATIVE EXAMPLE 25 | — | 19.9 | 1.026 | 1720 | 745 | 87 | 460 | 115 |

The polypropylene-based resin composition of the present invention and molded article thereof have sufficient practical performance for various parts of industrial products, e.g., automobile parts which have been increasingly consumed year by year, in particular bumpers, outer panels, instrument panels, garnishes and the like, which have been demanded to be thinner, more functional and larger, and home electric/electronic appliance parts, e.g., TV set cases. Therefore, the present invention represents techniques which can reduce in various properties. And, it is a suitable material for material recycling, because polypropylene is a thermoplastic resin, which is inherently recyclable for repeated use.

What is claimed is:

1. A process to prepare a pelletized or molded article of a polypropylene-based resin composition comprising the following steps:

combining in a melt-kneading device;

component (A): propylene homopolymer having an MFR of 10 g/10 minutes or more and isotactic pentad fraction of 98.0% or more, and/or propylene block copolymer having an MFR of 30 g/10 minutes or more and composed of a propylene homopolymer portion and copolymer portion of propylene and another α-olefin, the propylene homopolymer portion having an isotactic pentad fraction of 98% or more, and the copolymer portion containing propylene at 30 to 85% by weight and having a weight-average molecular weight of 400,000 or more: 10% by weight or more but less than 89% by weight, component (B): at least one species of inorganic filler selected from the group consisting of talc, calcium carbonate, natural mica, synthetic mica, wollastonite and montmorillonite, having an average particle size of 10 μm or less, determined by laser diffractometry: more than 0% by weight but 30% by weight or less, and component (D): ethylene- and/or styrene-based elastomers having an MFR of 0.1 to 20 g/10 minutes and density of 0.850 to 0.910 g/cm³: 5 to 50% by weight;

performing melt-kneading device of components (A), (B) and (D);

adding component (C): carbon fibers having a fiber diameter of 2 to 15 μm and fiber length of 1 to 20 mm: 4 to 20% by weight through a side feeder of the melt-kneader to disperse the carbon fibers and maintain an average length of 0.05 mm or more but less than 0.09 mm; and extruding the resulting polypropylene-based resin composition in pellets or molded shape.

2. The process to prepare polypropylene-based resin composition according to claim 1, wherein the components (A) to (D) satisfy the following conditions:

(A): the propylene block copolymer which has the copolymer portion containing propylene at 30 to 65% by weight: 10 to 89% by weight, (B): the inorganic filler: 5 to 30% by weight, (C): the carbon fibers having a fiber diameter of 3 to 15 μm: 4 to 10% by weight, and (D): the ethylene- and/or styrene-based elastomers: 5 to 50% by weight.

3. The process to prepare polypropylene-based resin composition according to claim 1 or claim 2, wherein the ethylene-based elastomer as the component (D) is at least one species of copolymer selected from the group consisting of ethylene/propylene, ethylene/butene and ethylene/octene copolymers, and contains the comonomer component at 10 to 50% by weight.

4. The process to prepare polypropylene-based resin composition according to claim 1 or claim 2, wherein the styrene-based elastomer as the component (D) is a styrene-based, hydrogenated block copolymer rubber of the following structure, A-B or A-B-A, wherein, A is a segment of polystyrene structure, B is a segment of ethylene/butene or ethylene/propylene structure, and the segment A has a polystyrene structure at 1 to 25% by weight.

5. The process to prepare polypropylene-based resin composition according to claim 1 or claim 2, wherein the composition has an MFR of 10 to 130 g/10 minutes, linear expansion coefficient at 23 to 80° C. is $0.1 \times 10^{-5}$ cm/cm° C. or more but less than $3 \times 10^{-5}$ cm/cm° C., density of 0.91 to 1.2 g/cm³, flexural modulus of 2000 MPa or more, and Izod impact strength of 200 J/m or more at 23° C. and 40 J/m or more at −30° C.

6. The process according to claim 1, wherein said component (A) is a propylene block copolymer having an MFR of 30 g/10 minutes or more and composed of a propylene homopolymer portion and copolymer portion of propylene and another α-olefin, the propylene homopolymer portion having an MFR of 210 to 400 g/10 minutes.

7. The process to prepare a pelletized or molded article of a polypropylene-based resin composition according to claim 1, further comprising molding said composition by a molding method selected from the group consisting of injection molding, compression molding and injection compression molding.

8. The process to prepare a pelletized or molded article of the polypropylene-based resin composition according to claim 7, wherein the molded article is a member selected from the group of molded articles consisting of an automobile part, housing for home electric/electronic appliances and building part.

* * * * *